March 3, 1970   G. W. BINGLEY   3,498,427
CLUTCH RELEASED BY SIMULTANEOUS ENGAGEMENT OF SEPARATE BRAKES
Filed Aug. 13, 1968
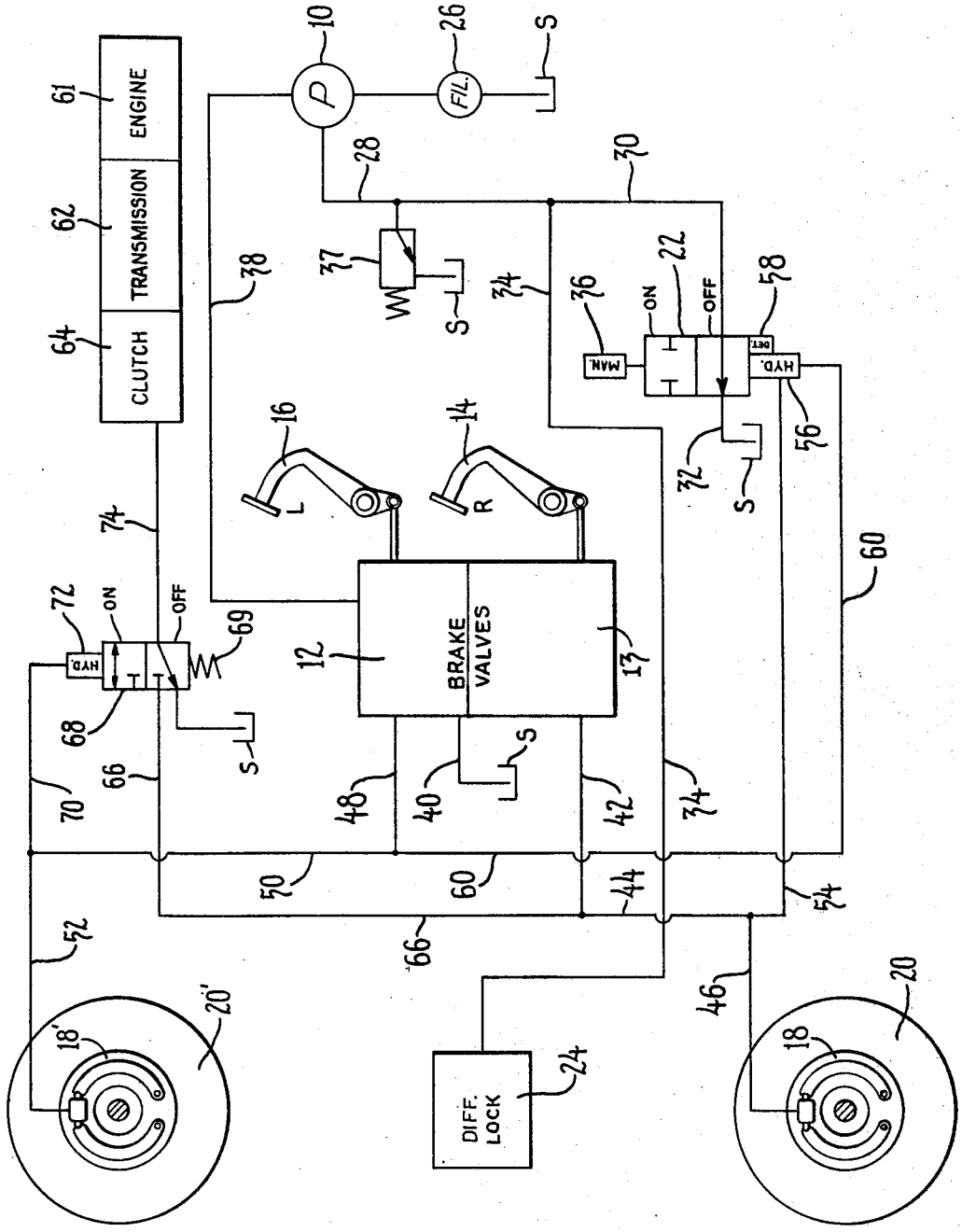
INVENTOR.
GEORGE W. BINGLEY
BY
Tweedale & Gerhardt
ATTORNEYS.

United States Patent Office 3,498,427
Patented Mar. 3, 1970

3,498,427
CLUTCH RELEASED BY SIMULTANEOUS ENGAGEMENT OF SEPARATE BRAKES
George W. Bingley, Stow, Ohio, assignor to Massey-Ferguson Inc., Des Moines, Iowa, a corporation of Maryland
Filed Aug. 13, 1968, Ser. No. 752,222
Int. Cl. F16d 67/02
U.S. Cl. 192—13                                    6 Claims

ABSTRACT OF THE DISCLOSURE

A vehicle has a transmission with a normally engaged clutch, a brake for each of two driving wheels, a control for each brake, and a differential locking mechanism. A hydraulic circuit is provide for each brake, one of which is connected to a clutch actuator through a control valve. The other brake circuit is connected to an actuator for the control valve so that operation of both brakes simultaneously causes disengagement of the clutch to disestablish the drive between the transmission and the wheels.

---

This invention relates generally to vehicle transmission controls and more particularly to means for automatically disestablishing a drive between the vehicle transmission and the drive wheels in response to application of two vehicle brakes.

Construction vehicles, such as a backhoe-loader, are provided with hydraulic motors, powered by an engine-driven pump, which operate the brakes, the backhoe, the loader and other accessories. Each of the two brakes has a separate control pedal to assist in steering. When using the loader, it is desirable to bring the vehicle to a complete stop and neutralize the transmission to provide maximum power or speed for loading. Conventional vehicles are usually provided with a third brake control pedal for applying both brakes together and for neutralizing the transmission. To properly maneuver and operate the vehicle, the operator must attain a great degree of skill, since he has only two feet to operate all three brake pedals.

It is therefore an object of this invention to provide a vehicle of this type with means for neutralizing the transmission and the wheels, and the first and second both brakes, thereby eliminating the third brake pedal.

In accordance with this invention, a vehicle of this type is provided with first and second fluid actuated brakes, a fluid circuit for each of the first and second brakes, each circuit including an operator for controlling application of pressure to each of the brakes, a transmission including an actuator for disengaging the transmission, a fluid circuit for the transmission actuator including a source of pressure fluid and a fluid pressure responsive valve movable between a position permitting communication between the source and the transmission actuator and a position preventing such communication to thereby control engagement and disengagement of the transmission, means normally positioning the valve in one of the positions, and a fluid passageway connecting each of the brake circuits and the valve, whereby operation of both brake operators to apply pressure to both brakes moves the valve from the said one position to the other position to affect communication between the source and the transmission actuator and cause the actuator to disengage the transmission.

Other objects and features of this invention will become readily apparent upon reference to the following detailed description of a preferred embodiment of this invention, as shown on the annexed drawing in which the single figure is a schematic representation of an automatic transmission control according to this invention.

The figure shows a portion of an open center hydraulic system for a backhoe-loader type of vehicle. Generally, the system includes a flow divided pump 10 and a conventional brake valve unit comprising brake valves 12 and 13 including right and left brake control pedals 14 and 16 for controlling actuation of respective right and left brakes 18 and 18' for the drive wheels 20 and 20'. The circuit also includes a control valve unit 22 for conventional differential lock 24 provided for preventing differential action between the drive wheels 20 and 20'.

More specifically, the pump 10 draws hydraulic or other pressure fluid from a common sump S through a filter 26 and pumps the fluid through fluid passageways 28 and 30 to the control valve 22. The valve 22 is normally positioned in the illustrated "off" position so that fluid drains through a fluid passageway 32 to the sump S. A parallel passageway 34 supplies fluid to the differential lock 24, which is normally not pressurized because of the drainage to sump S through valve 22. The valve 22 has a manual control 36 for moving the valve to the "on" position to block fluid flow through passageway 32 to sump S, thereby pressurizing passageway 34 to actuate the differential lock 24. Passageway 28 is provided with a pressure relief valve 37 for limiting pressure supplied to passageways 30 and 34.

In another branch of the circuit, pump 10 supplies hydraulic fluid through a priority fluid passageway 38 to the brake valve unit 12, which normally drains to sump S through a fluid passageway 40. When it is desired to apply the right brake 18, pedal 14 is depressed and, in a conventional manner, blocks drainage to sump S and directs fluid through fluid passageways 42, 44 and 46. In a similar manner, movement of brake pedal 16 will direct fluid through fluid passageways 48, 50 and 52 to apply the left brake 18'.

Application of either brake effects movement of control valve 22 from "on" to "off" position. Upon movement of the right brake pedal 14, pressure fluid also flows from passageway 44 through a fluid passageway 54 to a hydraulic actuator 56 which overcomes a position detent 58 and moves the valve 22 to the "off" position. Similarly, movement of the left brake pedal 16 directs fluid from passageway 48 through a fluid passageway 60 to actuator 56 which also moves valve 22 to "off" position.

The automatic transmission control feature will now be described in greater detail. An engine 61 drives a conventional transmission 62 which drives wheels 20 and 20' by conventional means (not shown). The transmission is provided with a normally engaged conventional clutch 64 which is disengageable by pressure fluid to neutralize the transmission and disestablish a drive to wheels 20 and 20'.

From brake valve unit 12, passageway 42 is connected through a fluid passageway 66 to a logic valve 68 which is normally biased to the illustrated "off" position by a spring 69. Passageway 48 is connected through passageway 50 and a fluid passageway 70 to a hydraulic actuator 72 for the valve 68.

Movement of left brake pedal 16 pressurizes passageway 70 and causes actuator 72 to shift valve 68 to the "on" position. This connects passageway 66 across valve 68 and through a fluid passageway 74 to the clutch 64. When the valve 68 is in the "on" position, movement of the right brake pedal 14 pressurizes passageways 66 and 74 and disengages clutch 64 to neutralize the transmission. It is readily apparent that independent movement of either the right or left brake pedals 14 or 16 will not neutralize the transmission. Concurrent movement of both brake pedals is required, since pressure fluid from one brake circuit shifts the valve 68 and pressure fluid from the other brake circuit is required to disengage the clutch.

In this manner, selective braking will have no effect on the transmission, while full braking will cause the transmission to shift to neutral, providing maximum power for operation of the loader. By use of this invention, the cumbersome third brake pedal is eliminated. This invention also enables one operation, i.e. application of both brakes, to both neutralize the transmission and deactuate the differential lock.

It is readily apparent that obvious modifications to this invention could be made, such as use of a servo-type of brake system, or a closed center hydraulic circuit, or a clutch normally disengaged but engaged by fluid pressure; the left and right brake lines could also be reversed; the logic valve and pressure line could be replaced by fluid pressure responsive electrical or mechanical actuators.

What I claim is:

1. A vehicle having first and second drive wheels having first and second fluid operated brakes, a fluid circuit for each of the first and second brakes, each circuit including a separate manual control for controlling application of pressure to each of the brakes, a transmission for driving the wheels including fluid responsive means for disestablishing the drive between the transmission and the wheels, a fluid circuit including a source of pressure fluid and a fluid pressure responsive valve movable between a position permitting communication between the source and the fluid responsive means and a position preventing such communication to thereby control the drive between the transmission and the wheels, means normally positioning the valve in one of the positions and a fluid passageway connecting each of the brake circuits and the valve, operation of both brake controls to apply pressure to both brakes simultaneously moving the valve from the said one position to the other position to affect communication between the source and the fluid responsive means to disestablish the drive between the transmission and the wheels simultaneously with brake application.

2. In a vehicle having drive wheels, a transmission for driving the wheels, a normally engaged fluid responsive clutch disengageable to disestablish the drive between the transmission and the wheels, and first and second fluid operated brakes, fluid circuit means comprising, in combination:
   a source of pressure fluid,
   first and second fluid passageways interconnecting the source and the respective first and second brakes,
   first and second brake control valves located in the respective first and second passageways and movable between positions permitting and preventing communication between the source and each brake to respectively operate each brake,
   a third fluid passageway interconnecting the clutch and the first passageway,
   a clutch control valve located in the third passageway and movable between positions permitting and preventing communication between the first passageway and the clutch,
   means normally locating the clutch control valve in the communication preventing position,
   a pressure responsive actuator for moving the clutch valve between positions, and
   a fourth fluid passageway interconnecting the clutch valve actuator and the second passageway,
   whereby movement of the second brake control valve to apply the second brake transmits pressure fluid through the fourth passageway to move the clutch valve to communication permitting position, and movement of the first brake control valve to apply the first brake transmits pressure fluid through the third passageway to disengage the clutch and disestablish the drive between the transmission and the drive wheels.

3. The combination of claim 2, wherein
   the source of pressure fluid includes a pump and a sump therefor,
   the first and second brake valves include a drain fluid passageway interconnecting the first and second passageways with the sump,
operation of the brake operators blocking the drain passageway to pressurize the first and second passageways and operate the brakes, the clutch control valve includes another drain fluid passageway interconnecting a portion of the third fluid passageway and the sump to deactuate the clutch, movement of the clutch control valve to communication permitting position blocking the said another drain passageway to enable pressure fluid to actuate the clutch.

4. The combination of claims 2 and 3, wherein the vehicle includes a pressure operated differential lock, the fluid circuit means including fluid passageway means interconnecting the source and the differential lock, a control valve located in the said fluid passageway means and movable between positions effecting pressurization and depressurization of the differential lock, a pressure responsive actuator for moving the differential lock control valve between positions, a fifth fluid passageway interconnecting the first passageway and the differential lock control valve actuator, and a sixth fluid passageway interconnecting the second passageway and the differential lock control valve actuator, whereby application of either brake moves the differential lock control valve to depressurization position to effect depressurization of the differential lock and concurrent application of both brakes depressurizes the differential lock and disestablishes the drive between the transmission and the drive wheels.

5. A vehicle having right and left drive wheels, a drive for the wheels, independent brakes and controls for each wheel, and means responsive to the concurrent operation of both brake controls to apply both brakes for simultaneously disestablishing the drive to the wheels, while maintaining the drive to the wheels upon operation of a single brake control to apply a single brake.

6. The vehicle of claim 5, wherein the brakes are pressure fluid operated, and including means for transmitting brake pressure fluid to the means for disestablishing the drive to the wheels for the operation thereof.

References Cited

UNITED STATES PATENTS

| 2,392,423 | 1/1946 | Stephens | 192—13 |
| 3,398,819 | 8/1968 | Ruhl et al. | 192—13 XR |

CARLTON R. CROYLE, Primary Examiner

A. D. HERRMANN, Assistant Examiner

U.S. Cl. X.R.

180—6.2; 188—152; 192—4